Feb. 18, 1969
L. GILBERT
3,427,795
MACHINE FOR PICKING ASPARAGUS
Filed Oct. 3, 1966
Sheet 5 of 6
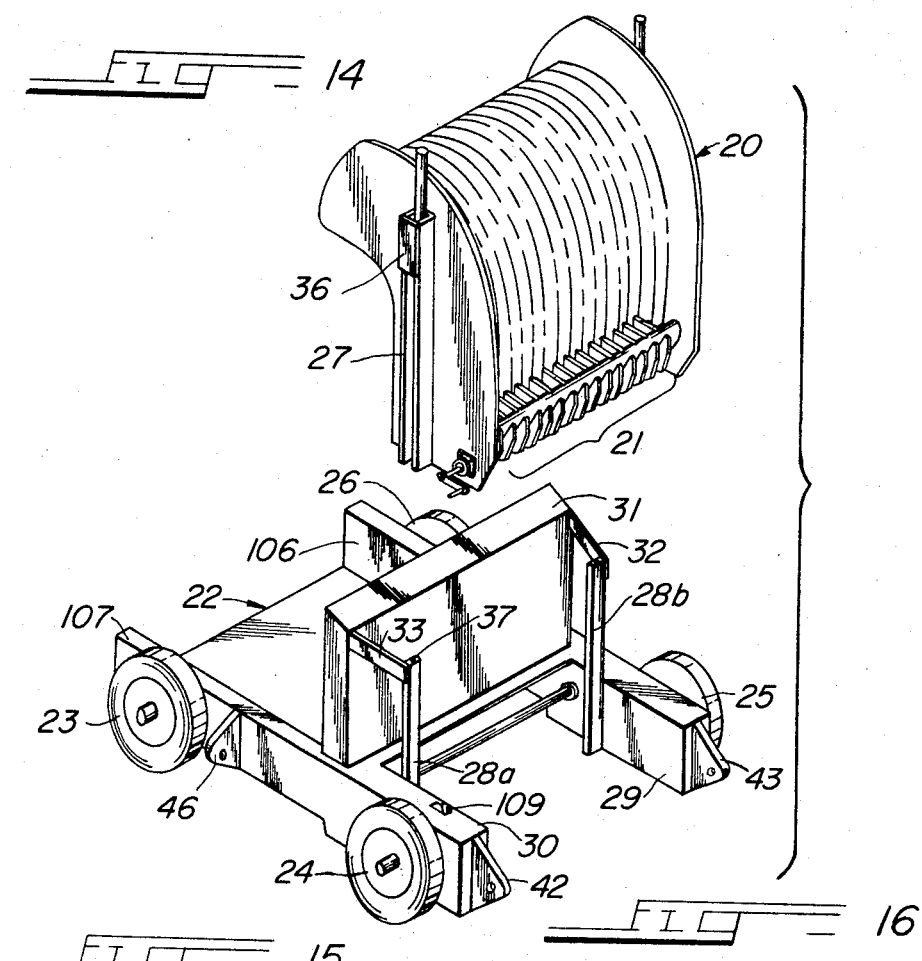
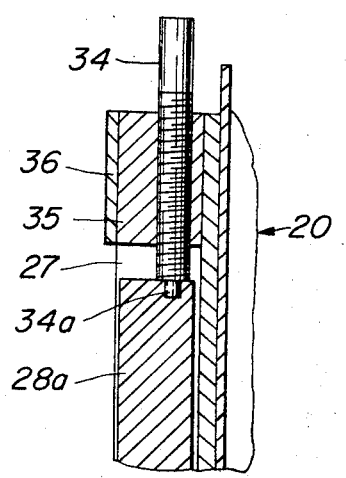
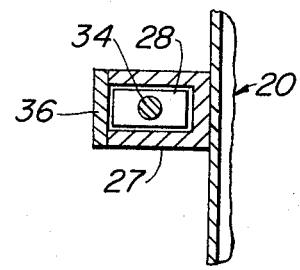
INVENTOR.
LLOYD GILBERT
BY

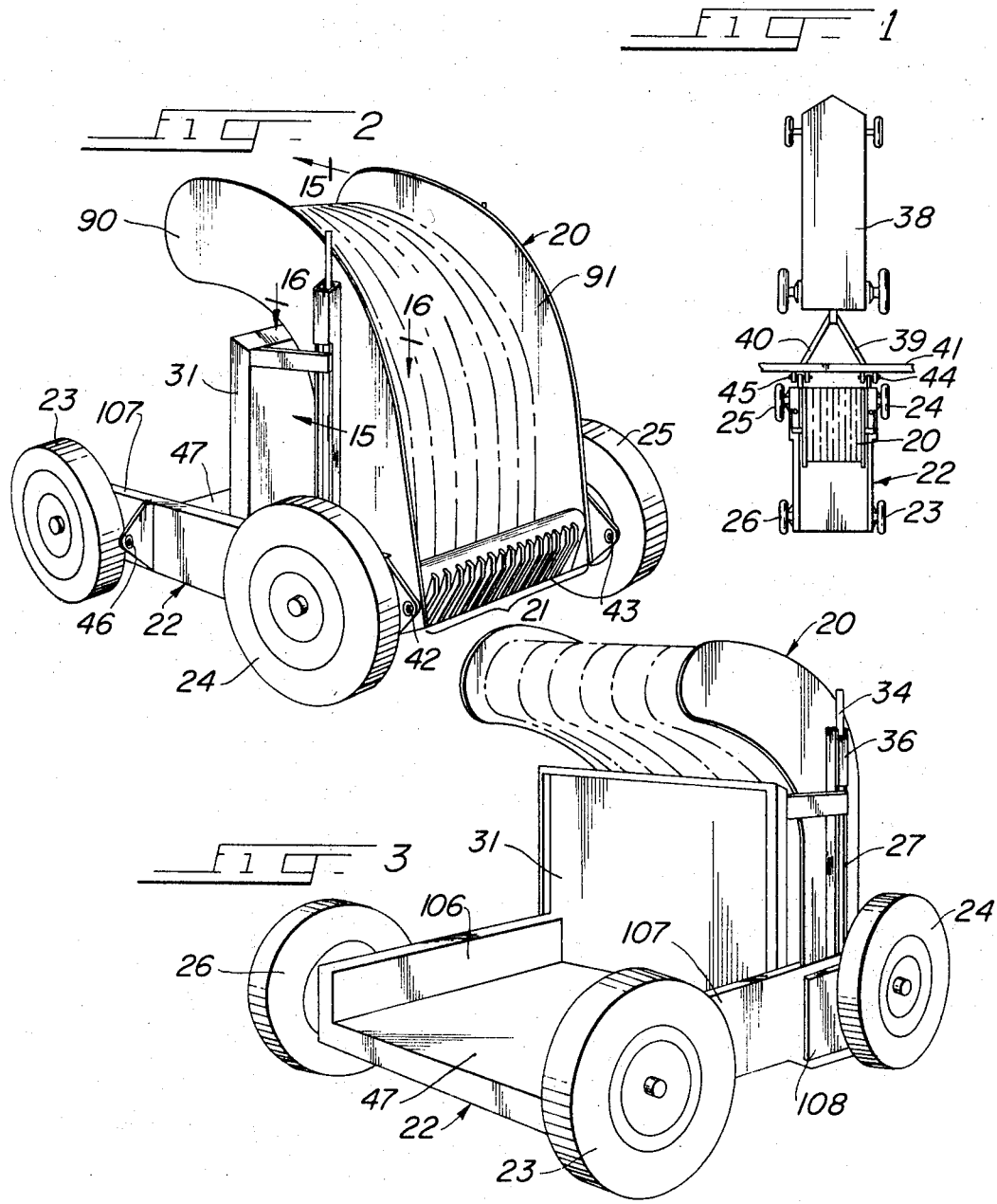

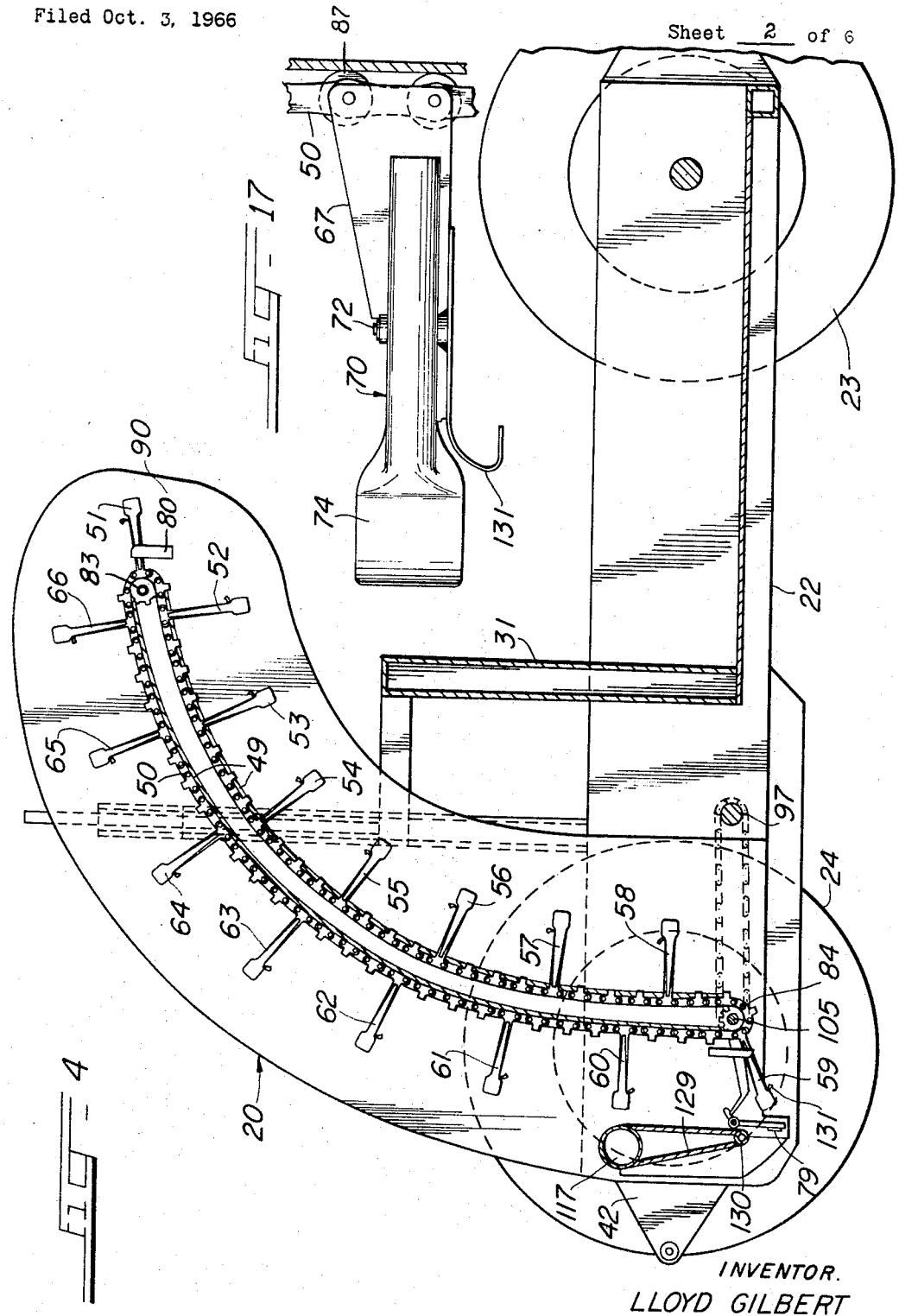

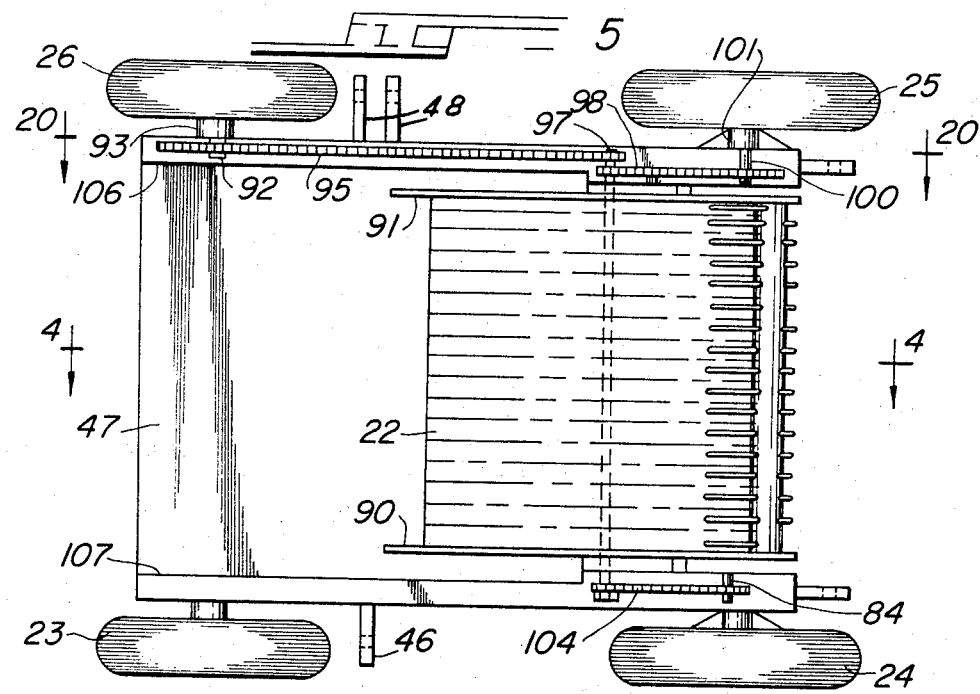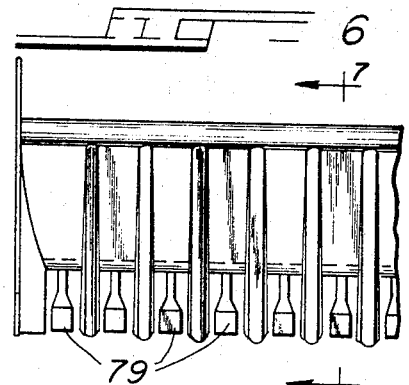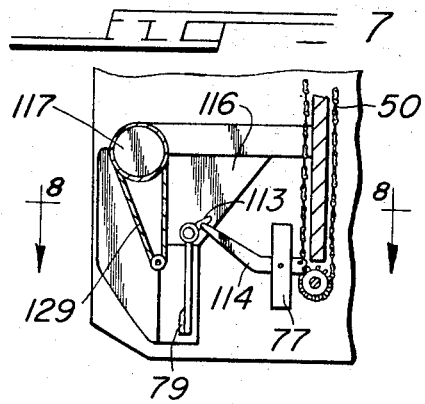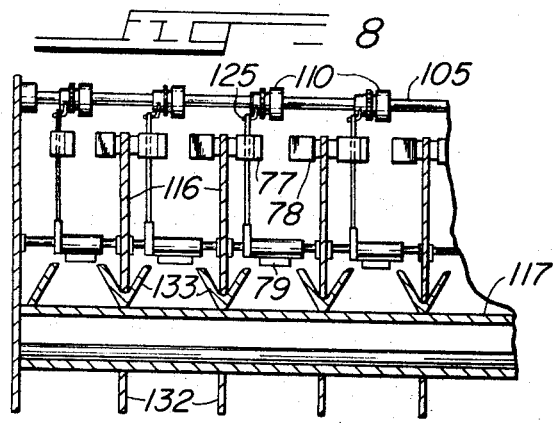

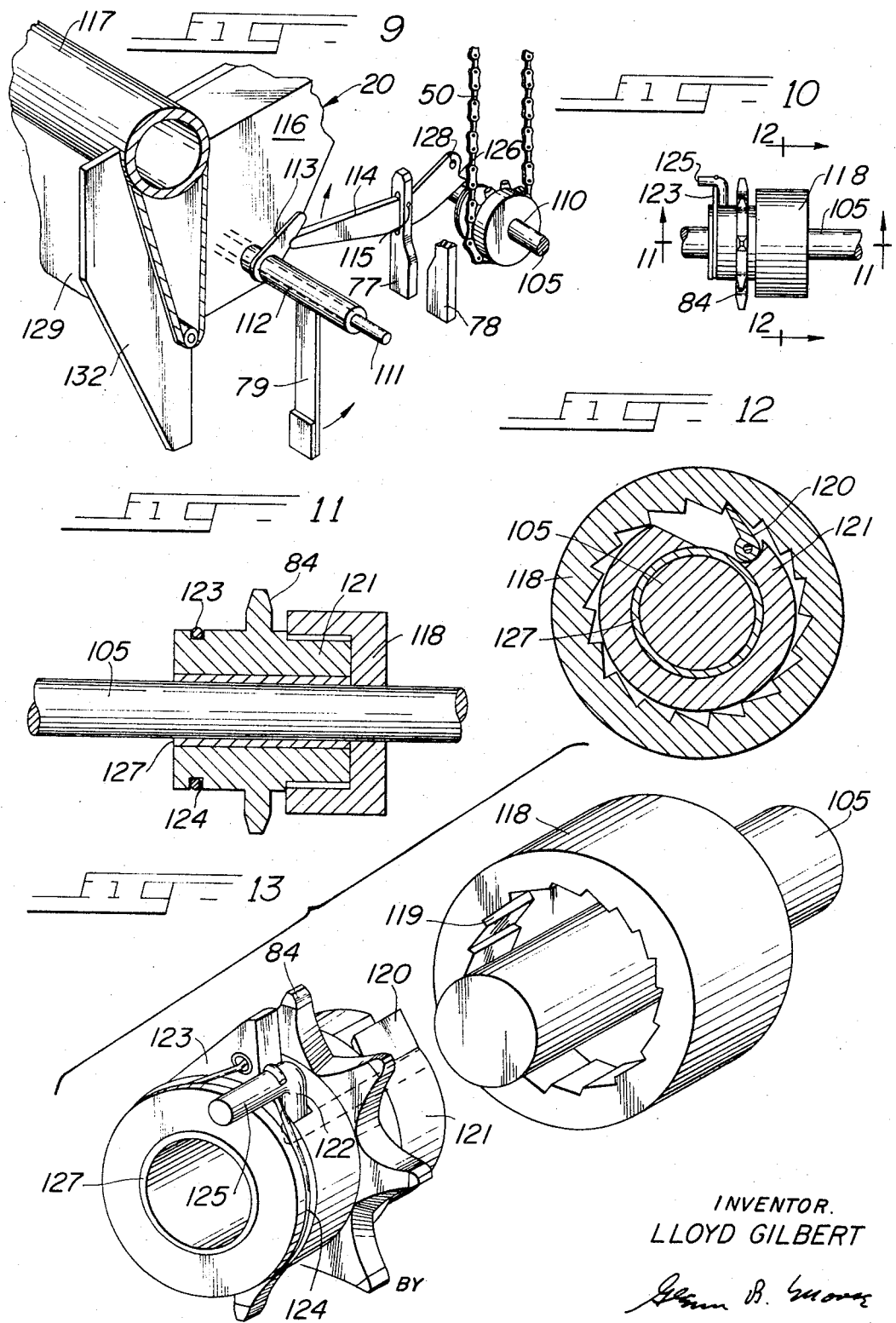

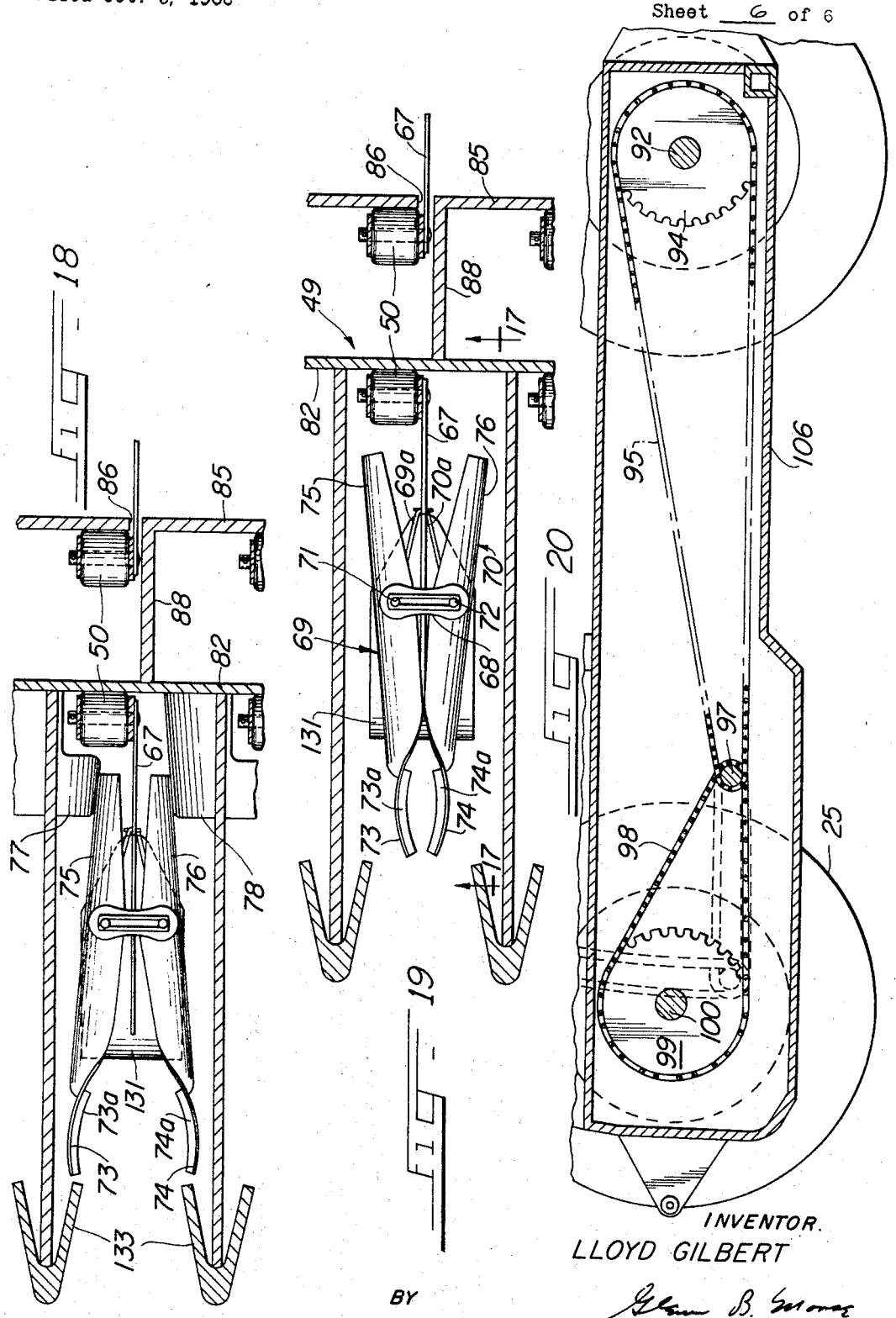

United States Patent Office 3,427,795
Patented Feb. 18, 1969

3,427,795
MACHINE FOR PICKING ASPARAGUS
Lloyd Gilbert, Ravenna, Mich. 49451
Filed Oct. 3, 1966, Ser. No. 583,877
U.S. Cl. 56—327     16 Claims
Int. Cl. A01d 43/06

ABSTRACT OF THE DISCLOSURE

This invention provides a machine for snap-picking asparagus. The progressive automation of farm operations has resulted in the development of machines for mechanically harvesting most crops. The elimination of manual operations produces great savings, and eliminates dependence upon itinerant or migratory labor sources. The harvesting of asparagus, however, has included an operation that has resisted mechanization. Stalks of asparagus have a transition point between a rough woody lower part and a tender portion which includes the tip. This transition takes place at roughly ⅙ of the stalk height above ground and a stalk will tend to break at that point on bending. The break will be sharp, giving rise to the term "snap-picking." Canneries and frozen-food processors require breaking of the asparagus stalk, and do this as a secondary operation if the asparagus has been harvested by cutting. The main concern is to separate the touch part of the stalk from the tender edible portion. The necessity of the extra operation results in a lower value for cut asparagus, and an outright refusal of some processors to accept it. The common harvesting process is therefore to employ large numbers of persons to laboriously pick the stalks by hand by snapping them between the fingers. In the period of maximum growth, a row of asparagus should be picked every day to obtain the optimum stalk length. The labor problems in such an operation are obvious.

The present invention is the first machine known to applicant that successfully duplicates the mechanically-induced forces that are required to correctly snap-pick asparagus stalks. A progressively increased localized bending moment is applied to the stalk as the machine passes over, with no cutting or pull-out being involved. The snapped stalk remains in the grasp of the picking device until it is elevated and deposited in a container. the picking devices are individually energized in response to the presence of a particular stalk in the path of the device, and the movement of the device during the picking operation is such as to largely cancel out the forward motion of the machine as it moves down the row. This action is responsible for the application of an almost exclusively bending movement to the stalk at the time of breakage. The several features of the invention will be analyzed in further detail through a discussion of the particular embodiments illustrated in the accompanying drawings.

In the drawings:

FIGURE 1 is a schematic plan view on a reduced scale showing the manner in which a machine embodying the invention is towed behind a conventional tractor.

FIGURE 2 is a perspective view on an enlarged scale of a complete machine embodying the invention, taken from the front quarter.

FIGURE 3 is a perspective view from the rear quarter of the machine illustrated in FIGURE 2.

FIGURE 4 is a central longitudinal sectional view on an enlarged scale of the machine illustrated in FIGURES 2 and 3.

FIGURE 5 is a plan view of the machine shown in FIGURE 4, on a reduced scale.

FIGURE 6 is a fragmentary front elevation of a portion of the machine adjacent to the picking devices.

FIGURE 7 is a section on the plane 7—7 of FIGURE 6.

FIGURE 8 is a section on the plane 8—8 of FIGURE 7.

FIGURE 9 is a view on an enlarged scale showing the components of the detector control.

FIGURE 10 is a front elevation showing one of the clutch members for coupling the picking device to the rotating shaft.

FIGURE 11 is a section on the plane 11—11 of FIGURE 10 on an enlarged scale.

FIGURE 12 is a section on the plane 12—12 of FIGURE 10, on an enlarged scale.

FIGURE 13 is an exploded view showing the components of the clutch device shown in FIGURE 10.

FIGURE 14 is a view showing the portion of the frame carrying the picking device removed vertically from the portion of the frame provided with the vehicle wheels.

FIGURE 15 is a section on an enlarged scale on the plane 15—15 of FIGURE 2 showing the mechanism for adjusting the relative vertical position of the frame portions.

FIGURE 16 is a section on an enlarged scale on the plane 16—16 of FIGURE 2.

FIGURE 17 is a fragmentary side elevation on an enlarged scale of one of the picking devices.

FIGURE 18 is a section on a horizontal plane showing a picking device and the guideway structure, with the device opened by the cam blocks.

FIGURE 19 is a section at a point along the guideway between the cam blocks, with a picking device in closed position.

FIGURE 20 is a section in side elevation of the lower portion of the frame, showing the chain arrangement.

Referring particularly to FIGURES 1–3 and 14, the machine has a frame portion indicated at 20 which carries the picking assemblies 21. This portion of the frame is vertically adjustable with respect to the lower frame portion 22 supported by ground-engaging wheels 23–26. In the preferred form of the invention, vertical freedom of adjustment is obtained by the provision of guideways in the frame portion 20, such as are indicated at 27, on opposite sides of the machine. The guideway 27 is preferably a channel-shaped configuration receiving the bars 28a and 28b in sliding relationship. These bars are secured at their lower extremities to the straddle-portions 29 and 30 of the frame 22 in some convenient manner, as by welding. The upper portions of the bars 28a and 28b are secured to the wall structure 31 by stabilizing straps 32 and 33. Vertical adjustability of the frame portion 20 with respect to the portion 22 is obtained through the provision of elongated bolts as shown at 34 in FIGURE 15, which are in threaded engagement with the blocks 35. These blocks are fixed with respect to the channel guideways 27, preferably through the use of a plate 36. The lower extremity of the bolt 34 preferably engages a recess as shown at 37 in the top of the bar 28a, with the recess functioning primarily as a locating bearing. This structure is duplicated at the opposite sides of the machine, and rotation of the bolts 34 will raise or lower the frame portion 20 with respect to the ground surface supporting the wheels 23–26.

When the two frame portions 20 and 22 are interengaged as shown in FIGURE 2, the resulting vehicle may be pulled along the ground over a row of asparagus by a tractor of any convenient design as indicated at 38 in FIGURE 1. Coupling links 39 and 40 will normally extend from the tractor to a beam 41, in the event it is desirable to use a group of picking machines at the same time.

Brackets 42 and 43 are provided at the front extremities of the portions 29 and 30 of the frame for interconnection with corresponding brackets on the beam 41, with the connection being traversed by conventional coupling pins as shown at 44 and 45. The provision of side brackets as shown at 46 and 48 makes it possible to laterally interconnect the group of picking machines drawn by the beam 41, so that a pair of wheels (such as 23 and 24) may be shared by adjoining machines, thus eliminating slightly less than half of the wheels otherwise required. The rear portions of the machines are preferably provided with a platform as shown at 47 behind the wall structure 31 for receiving a crate or some other form of container. If such a container is positioned against the wall structure 31, the picked stalks of asparagus will be automatically deposited as the picking operation proceeds.

The frame section 20 has the primary function of providing a series of parallel guideways, each arranged in a vertical front-rear plane. Each picking mechanism has its own guideway, as indicated at 49 in FIGURE 4, which is essentially a track establishing the path of movement of a chain 50. A group of picking devices 51–66 projects laterally from the path of travel of the chain 50, as a result of the mounting of the central cantilever member 67 of each of these devices on one of the links of the chain. Transverse fulcrum members 68 are mounted on the outer ends of the cantilever arms 67 to provide pivotal support for the clamping arms 69 and 70 at the pins 71 and 72. The outer extremities of the arms 69 and 70 are provided with the jaws 73 and 74, which are elongated in a direction parallel to the chains. These jaws have sponge rubber pads as shown at 73a and 74a to prevent damage to the stalks of asparagus. The inner portions 75 and 76 of the arms 69 and 70 (toward the chains from the fulcrum pins 71 and 72) are received between the lower cam blocks 77 and 78 as the picking devices are carried around the path of movement of the chain 50. As the portions 75 and 76 move between the cam blocks, the clamping device is opened to the position shown in FIGURE 18. This position corresponds to that of the picking device 59 shown in FIGURE 4, which may be termed "rest" or "picking" position of the machine. A stalk of asparagus tall enough to engage the detector 79 will energize the picking device associated with the chain 50, and cause it to move an amount sufficient to position the picking device 60 in the "waiting" position of the device 59 as shown in FIGURE 4. As the picking device 59 moves out of the influence of the lower cam blocks 77 and 78, it will close over the stalk of asparagus as it swings downward and to the rear, with respect to the path of movement of the machine. This action grasps the stalk between the jaws 73 and 74, applying a gentle forward-bending action which snaps the asparagus in the desired manner. The jaws 73 and 74 are normally biased to a closed position by an interior spring 69a and 70a which results in maintaining the clamping action on the stalk of asparagus until the chain has (through successive picking operations) moved the stalk upwardly along the rear course of the chain to a position above the collection crate. At this point, the picking devices encounter the upper cam blocks 80, which bring the portions 75 and 76 together to induce release of the stalk of asparagus so that it will fall in the proper location.

The construction of the guideways producing this path of movement may take a variety of forms. The preferred construction illustrated in the drawings provides a forward wall 82 along which the chain 50 slides in a fixed path, resulting from tension applied to the chain. The upper portion of the chain is positioned by the sprocket 83, and the lower portion by the sprocket 84. The upper sprocket may be considered as an "idler," and is mounted in a suitable bearing structure secured to the frame portion 20. Tension between the sprockets 83 and 84 causes the chain 50 to follow a predetermined path over the arcuate convex surface of the wall 82. Since the rear wall 85 of the guideway structure is exteriorly concave, the chain 50 is carried within the hollow structure between the walls 82 and 85. The opening 86 permits the cantilever member 67 of the picking devices to extend through the guideway structure along the rear course of the path of movement of the chain. The chain 50 is of conventional construction, with the links being interconnected by pins which additionally function as bearings for rollers, as shown at 87. Web plates as shown at 88 maintain the arcuate configuration of the guideways, and are preferably positioned between each of the chains 50. The end plates 90 and 91 provide additional stiffening for the frame structure 20, and also shield the projecting picking devices from accidental contact with objects which might induce damage.

Drive mechanism

Power for operation of the chains 50 is derived from the traction of the ground-engaging wheels 25 and 26. The rear wheels are mounted on short axles as shown at 92 in FIGURE 5, which are supported in suitable bearing structure 93 secured to the frame 22. The axle 92 drives the sprocket 94, which transmits power to the picking mechanism through the chain 95. This chain extends to an idler sprocket carried on the idler shaft 97, which is rotatably mounted in suitable bearing structure (not shown) in the frame 22. A shorter drive chain 98 extends from the drive sprocket 99 carried by the front wheel shaft 100. This shaft is driven by the wheel 25, mounted in the bearing structure 101 mounted on the frame 22. Power from the traction of the wheel 25 is therefore supplied to the idler shaft 97 through a second idler sprocket carried thereby. This power is transferred across the machine through the shaft 97, where it is delivered through another sprocket to the horizontal power-transfer chain 104 to the sprocket 84 on the shaft 105 of the picking mechanism. The chains are preferably housed within the hollow side-wall structure 106 and 107. The drive mechanism is preferably confined to the wheels 25 and 26, since the wheels 23 and 24 may be removed when the machines are laterally interconnected at the brackets 46 and 48. An access door 108 in the sidewall structure 107 permits installation and adjustment of the chain 104, and it is preferable that a similar arrangement appear at the opposite side of the vehicle for providing access to the chain 98. The horizontal disposition of the chain 104 permits considerable vertical freedom of movement of the frame portion 20 with respect to the frame portion 22 without necessitating either objectionable slack in the chain, or special arrangements for varying the chain length. Removal of the frame portion 20 carrying the picking mechanism as shown in FIGURE 14, requires that the chain 104 be disconnected. A slot 109 has an opening in the top of the straddle portion 30 of sufficient size to permit withdrawal of the sprocket 84, and the slot continues down along the inside of the portion 30 of sufficient width to permit vertical adjustment and removal of the shaft 105.

The shaft 105 will normally be rotating continuously as long as the vehicle is in motion. Power is supplied to the individual picking devices through a group of clutch assemblies 110. These clutch devices are controlled by the detectors 79, which are pivotally suspended from the shaft 111 carried by the frame portion 20. The bearing portion 112 of the detector has a sufficient length in engagement with the shaft 111 to provide stability, and also to transfer torque to the latch arm 113. The restraining arm 114 is pivotally mounted in the cam block 77 on the pin 115. Both the cam blocks 77 and 78 are mounted on partition plates 116 carried by the transverse beam 117 of the frame portion 20.

The clutch assembly controlled by the restraining arm 114 includes a cup member 118 that is fixed with respect to the shaft 105, and rotates with it. Interior teeth are provided on the cup at 119, and these cooperate with the dog 120 carried by the hub 121 of the sprocket 84. A crank 122 has an axial portion extending in a suitable groove in the hub 121, and is connected to the dog 120. Slight rotation of the crank 122 will cause the outer extremity of the dog 120 to move with a sufficient radial component to engage and disengage from the teeth 119, thus coupling and uncoupling the cup 118 from the hub 121. The crank 122 is biased in a clockwise direction, as viewed in FIGURE 13, by the spring 123 riding in the groove 124 of the hub 121. The end 125 of the crank 122 is disposed in alignment with the notch 126 of the restraining arm 114; and when in engagement with this notch, any tendency to rotate the clutch assembly will generate a force on the end 125 to produce a counterclockwise rotation of the dog 120 and thus induce disengagement. A predetermined resistance to rotation of the hub 121 is preferably provided by a bearing sleeve as shown at 127, which permits the shaft 105 to rotate continuously while the clutch is disengaged, without a chattering or oscillating action. Release of the restraining arm 114 by movement of the latch arm 113 in a counterclockwise direction, as viewed in FIGURE 9, will permit the arm 114 to rotate in a clockwise direction about the pin 115 a sufficient amount to permit the passage of the end 125 of the clutch crank. Thus freed of restraint, the spring 123 can rotate the dog 120 into engaging position, providing for the transfer of torque from the shaft 105 to the sprocket 84, and inducing movement of the chain 50 an amount corresponding to a single revolution of the clutch assembly. The spacing of the clamping members along the chain corresponds to this distance. As soon as the end 125 has passed the arm 114, either the weight of the arm, or a supplemental spring attached at the point 128, will induce return of the arm to the active restraining position shown in FIGURE 9. The effect of gravity on the pendulum-like detector 79 will similarly restore the latch arm 113 to engaging position, thus causing the rotation of the sprocket 84 to cease.

As a result of the position of the picking member 59, as shown in FIGURE 4, the grasping of the stalks of asparagus is facilitated by bending them slightly in advance of the engagement with the clamping device. This is accomplished by a combination of two structures. One of these is the downwardly-tapering extension 129 depending from the beam 117, and terminating at the rounded lower extremity 130. A stalk of a substantial height will encounter this structure and be bent forwardly as the vehicle moves over the ground. Whether or not a stalk is tall enough to reach the edge 130, a rounded bearing member 131 is provided on each of the clamping devices spanning the distance between the open jaws 73 and 74. As the stalk is embraced by the jaws, prior to the application of clamping action, the forward movement of the vehicle will cause the stalks to bend forwardly, rather than become entrapped between the structure of the clamping device. The entrance of the stalks into the embrace of the jaws is guided by a combination of the comb plates 132 and the members 133. The latter provide a narrowing passage for the stalks to follow, and it is preferable that the open position of the gripping devices (in the position of the unit 59 in FIGURE 4) be such that the gap in the jaws is directly behind, and slightly greater, than the gap between the members 133. With this structure, any stalk entering between the comb plates 132 will be urged into the engagement with the picking mechanism.

The particular embodiment of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A machine for harvesting asparagus, comprising: a frame providing a plurality of endless guideways disposed in a normally vertical plane; endless chain means on said frame having members interengaged in each of said guideways, respectively; at least one releasable gripping member connected to and projecting laterally from each of said chain means; cam means on said frame associated with each of said guideways whereby said gripping members are disposed in an open condition when in a position adjacent the lower extremity of said guideways, and in gripping condition corresponding to picking position immediately thereafter with respect to movement of said chain means along said guideways; drive means for each of said chain means including a control responsive to encountering an object of selected height immediately in front of the gripping member carried by said chain means, said control being operative to energize said chain means and move the same to a position wherein a gripping member is again disposed in picking position, said drive means including means for halting said chain on arriving in said position; and releasing means on said frame along an upper portion of said guideways for inducing release of said gripping members to deposit picked asparagus at a selected point.

2. A machine as defined in claim 1, wherein the lower extremity of said guideways is arcuate.

3. A machine as defined in claim 1, wherein said frame is provided with ground-support wheels, and coupling means establishing a normal direction of movement of said frame over a ground surface.

4. A machine as defined in claim 3, wherein said drive means induces movement of said gripping members at the lower extremity of said guideways in a similar direction with respect to said frame as the normal movement of the ground surface with respect to said frame.

5. A machine as defined in claim 4, wherein said gripping members in said picking position extend downward, and also forward from said chain means with respect to the direction of movement of said frame.

6. A machine as defined in claim 5, wherein said gripping members have jaw portions elongated in a direction parallel to said chain means, and said jaw portions open and close transversely thereto.

7. A machine as defined in claim 1, wherein said drive means includes a shaft operated continuously during forward motion of said frame.

8. A machine as defined in claim 7, wherein said shaft is driven at a speed related to the forward motion of said frame.

9. A machine as defined in claim 7, wherein said control includes a clutch device operative to couple said chain means to said shaft for a predetermined amount of rotation in response to displacement of a detector disposed in alignment with a channel defined by said frame representing the width of a path within which a particular gripping member can seize an object.

10. A machine as defined in claim 9, wherein each chain means includes an evenly-spaced plurality of gripping members, and said amount of rotation corresponds to a movement of said chain means of one space between said gripping members.

11. A machine as defined in claim 1, wherein said gripping members include opposite arms, each with a jaw at the outer end thereof, and pivotally interconnected at an intermediate point, the inner portions of said arms being received between said cam portions for control of said jaws.

12. A machine as defined in claim 11, wherein said gripping members include bearing members disposed to deflect an object received between the said jaws.

13. A machine as defined in claim 1, wherein said frame has a portion carrying said guideways that is vertically adjustable with respect to a portion provided with ground-engaging wheels.

14. A machine as defined in claim 13, wherein said drive means includes endless flexible means and horizontally-spaced wheels on said frame portions, respectively, receiving said endless flexible belt means.

15. A machine as defined in claim 1, wherein said guideways extend upwardly at an incline in a front-rear direction from the lower extremity thereof.

16. A machine as defined in claim 15, wherein said guideways are arcuate, extending upward and curving to the rear from the lower extremity thereof.

References Cited

UNITED STATES PATENTS

| 2,690,043 | 9/1954 | Marihart | 56—327 |
| 2,767,544 | 10/1956 | Turkington | 56—327 |
| 2,791,878 | 5/1957 | Kepner | 56—327 |
| 3,066,469 | 12/1962 | Chatagnier | 56—327 |
| 3,176,456 | 4/1965 | Franzen | 56—327 |
| 3,380,234 | 4/1968 | Garrett | 56—327 |

RUSSELL R. KINSEY, *Primary Examiner.*